Figure 1:
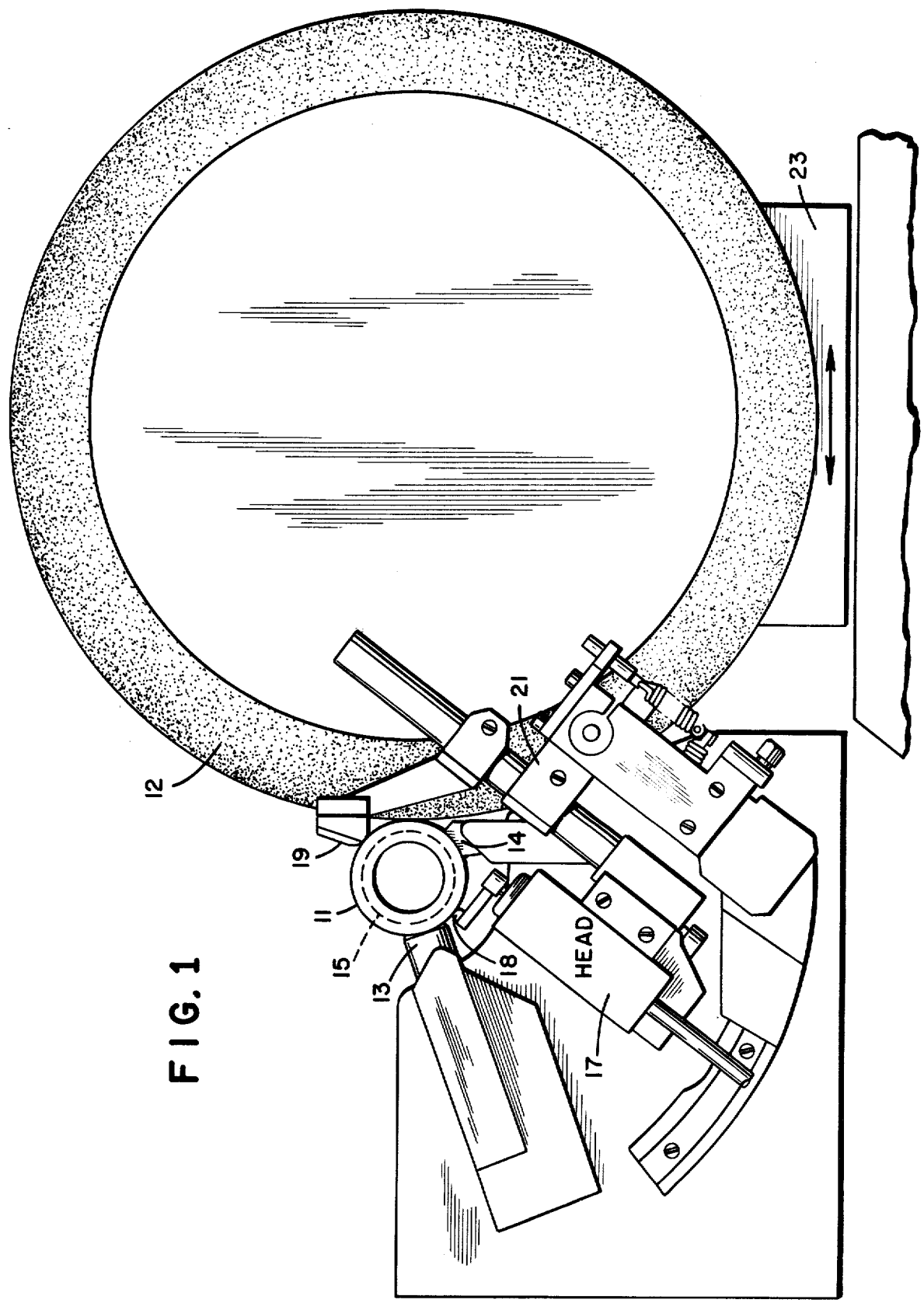

United States Patent [19]

Freddi

[11] 4,036,607

[45] July 19, 1977

[54] METHOD AND RELEVANT APPARATUS TO CHECK THE ROTATION OF MECHANICAL WORKPIECES BEING MACHINED ON GRINDERS

[75] Inventor: Tomaso Freddi, Bologna, Italy

[73] Assignee: Finike Italiana Marposs-Soc. In Accomandita Semplice di Mario Possati & C., Bentivoglio, Italy

[21] Appl. No.: 619,246

[22] Filed: Oct. 3, 1975

Related U.S. Application Data

[63] Continuation of Ser. No. 473,829, May 28, 1974, abandoned.

[30] Foreign Application Priority Data

May 25, 1973 Italy .................................. 3412/73

[51] Int. Cl.² ........................................... B24B 49/04
[52] U.S. Cl. ............................... 51/165 R; 33/143 L; 51/281 R; 51/165.91; 324/103 P
[58] Field of Search .................. 324/103 P; 33/143 L; 51/165 R, 165.8, 165.91, 165.92, 281 R

[56] References Cited

U.S. PATENT DOCUMENTS

| | | | |
|---|---|---|---|
| 3,768,010 | 10/1973 | Pozzetti | 324/103 P |
| 3,785,091 | 1/1974 | Pozzetti | 51/165 R |
| 3,828,439 | 8/1974 | Ishikawa | 33/143 L |
| 3,842,545 | 10/1974 | Possati | 51/165.71 |

*Primary Examiner*—Harold D. Whitehead
*Attorney, Agent, or Firm*—Stevens, Davis, Miller & Mosher

[57] ABSTRACT

A method for checking the rotation of mechanical workpieces which includes the steps of measuring the workpiece size, processing the measuring signals occurring to generate at least one signal responsive to the measurement of size variations of the workpiece and utilizing the signal for generating control signals to indicate the evenness of the rotation of the piece. An apparatus for practicing the method includes feelers adapted to be brought to the measuring position on the workpiece to supply signals responsive to the size, a processing unit adapted to process the measuring signals detected at succeeding moments to supply information on the geometrical features of the workpiece or its variations, delay and timing units to trigger the processing unit connected with the output of the processing unit and adapted to compare the signals at the output itself with preset reference signals and a consent unit connected with the comparison unit operable as a result of the evenness of the workpiece rotation.

10 Claims, 2 Drawing Figures

METHOD AND RELEVANT APPARATUS TO CHECK THE ROTATION OF MECHANICAL WORKPIECES BEING MACHINED ON GRINDERS

This is a continuation of application Ser. No. 473,829, filed May 28, 1974, and now abandoned.

The invention relates to a method and relevant apparatus to check the rotation of mechanical workpieces being machined on grinders. More particularly the invention relates to grinders in which the pieces rest on shoes and are rotated through a spindle fitted with an electromagnetic clamping device. One of the inconveniences of grinders of this type consists in that sometimes the pieces while being machined do not revolve regularly. This irregularity may depend on the power of operation of the spindle being too low, insufficient or no magnetic attraction of the spindle on the piece, excessive pressure of the grinding wheel on the piece, poor pre-machining of the piece or, faulty or badly arranged sliding shoes. The lack of regular rotation results in the production of faulty pieces and low productivity of the machine. Heretofore, the rotation has been checked by the operator of the machine through the visual over seeing of the piece. However, due to the shortness of machining cycles, this method isn't conducive to full automation of the grinders thereby letting only one opertor check a number of machines.

Among other things, this trend brought about the manufacturing of gauges adapted to measure the piece sizes during the machining, the changes of the sizes in time, i.e. the removal date, an acknowledgement of errors in the shapes of the pieces, and the operation of the various phases of the grinding cycle accordingly. There exist several types of gauges, in particulr electronic and pneumatic gauges. However, no device has been made up-to-now which is able to check the real rotation of the piece. Therefore it is an object of the present invention to provide a method to automatically check the lack of or faulty rotation of the piece on grinders. Another object of the present invention is to provide an apparatus which can supply a signaling and carry out advisable operations automatically as a consequence of the lack of or faulty rotation of the piece on grinders, thus avoiding the production of faulty workpieces and low productivity of the machine. These and further object and advantages are achieved by a method which checks the rotation of mechanical pieces on grinders in which the piece sizes are measured by generating measuring signals responsive to the piece sizes according to fixed directions with respect to the machine. The method according to the invention foresees procesing the measuring signals to detect at least one variable depending on the relative displacement of the surface of the piece with regard to the fixed directions, the variable being used to generate consent signals responsive to the evenness of the rotation of the piece. An apparatus to embody the method includes measuring means adapted to provide signals responsive to the piece sizes and processing means adapted to process the measuring signals detected in succeeding moments, to provide information on the geometrical features of the piece and/or on their variations. The apparatus according to the pesent invention besides includes delay means to trigger the processing means, comparison means to compare the output signals of the processing means with preset reference signals and consent means which can be operated by the comparison means as a result of an irregular rotation of the pieces. According to a particular feature of the present apparatus, the processing means includes a known circuit to reckon the shape errors of the workpieces, the output of said circuit being connected with an input of the comparison means to check the rotation of the piece before the beginning of the stock removal from the piece itself. According to a further characteristic of the apparatus of the present invention, the processing means include a known circuit to reckon the rate of stock removal from the piece being machined, the output of the circuit being connected with an input of the comparison means to check the rotation of the piece during the stock removal phases.

Figure 2:
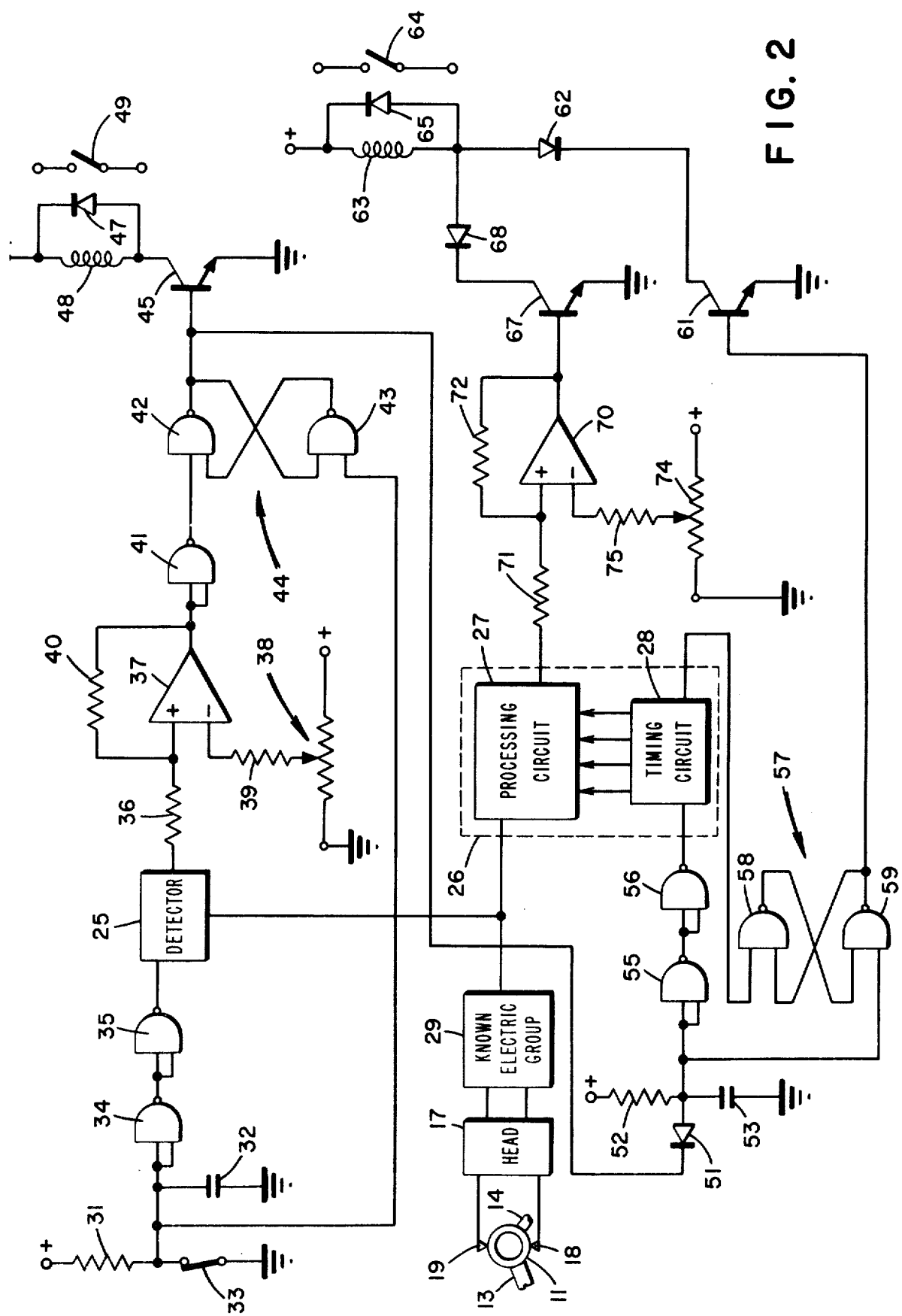

The present invention now will be described in more detail by reference to the attached drawings representing a preferred but non limiting embodiment in which:

FIG. 1 shows an external grinder in which the piece to be machined resting on sliding shoes is measured by an electronic gauge and FIG. 2 illustrates a wiring diagram of an apparatus made according to the present invention which is particularly suitable for application on grinders of the type of FIG. 1:

With reference to FIG. 1, the piece to be machined is formed of a ring 11 the outer cylindrical surface of which has to be ground by a grinding wheel 12. The piece is usually loaded on the machine and unloaded by automatically operated mechanical arms not shown. Ring 11 rests on shoes 13, 14 and is rotated by a spindle 15 (dashed) which grasps it by electromagnetic action.

The sizes of ring 11, or more exactly the deviations of stock with regard to the nominal sizes, are detected by an electronic gauge including a measuring head 17 having a feeler 18 mobile with respect to a fixed reference feeler 19.

Head 17 is mounted on the machine by an oscillating support 21 which allows the head itself to precisely follow the variations of the diameter of the ring 11 and makes it possible to load and unload it.

Grinding wheel 12 is supported by a slide 23 which carries out the movements of fast approach, feeding during the machining and returning of the tool.

Such grinding machines allow for a very high hourly output and very good machining qualities.

However, it may happen that the pieces do not revolve evenly; in such a case, if the machine operator doesn't intervene immediately, the pieces undergo some burning and chamfer resulting in making them scrap.

Therefore besides the loss of workpieces there is decreasing productivity of the machine, since the latter works to produce scrap pieces.

With reference to FIG. 2, the checking of machining is carried out through a first electric unit 25 which detects the irregularities of the shape (i.e. the ovality) of ring 11 and a second electric unit 26, formed by a processing circuit 27 and a timing circuit 28, adapted to reckon the stock removal rate.

The two units 25, 26 can be made substantially as described in the U.S. Pat. Nos. 3,768,010 and 3,785,091 respectively.

From a known electric group 29, detecting and amplifying device, units 25, 26 receive signals responsive to the sizes detected by feelers 18, 19.

The apparatus of FIG. 2 uses the output signals of units 25, 26 to check whether ring 11 rotates evenly both before the beginning of the stock removal and during it.

The circuits arranged at the input of unit 25, which trigger unit 25, include a resistance 31, one terminal of which is connected with a positive voltage source whereas the other is connected with a capacitor 32 and a switch 33 comprised in the machine cycle control box 30 and closed under conditions of rest.

Capacitor 32 is parallelly connected to an input of NAND 34 whose output controls unit 25 through another NAND 35.

The output of unit 25 is connected with the positive input of an operational amplifier 37 through a resistance 36. At the negative input operational amplifier 37 receives an adjustable reference voltage supplied, through a resistance 39, by a potentiometer 38 fed by a suitable voltage source.

Amplifier 37 is connected in feedback on the positive input by a resistance 40.

The output of amplifier 37 is connected to an input of NAND 41 whose output is connected with a SET input of a bistable circuit 44 formed by two NANDs 42, 43. Bistable circuit 44 is connected at the output with the base of a NPN transistor 45.

Another input (RESET) of bistable circuit 44 is connected with the common node of resistance 31, capacitor 32 and switch 33. Series-connected with the collector of transistor 45 there are, connected in parallel between them, a suppressor diode 47 and a winding 43 of a relay having a contact 49 comprised in the machine cycle control box and open under rest conditions of rest.

The base of transistor 45 is connected to the common node of a resistance 52 and a capacitor 53 through a de-coupling diode 51. Resistance 52 is connected with a positive voltage source.

Capacitor 53 is in parallel with an input of a NAND 55 whose output controls timing circuit 28 through another NAND 56. Moreover capacitor 53 is connected with an input (RESET) of a bistable circuit 57 formed by two NANDs 58, 59. The other input (SET) of bistable 57 is connected with timing circuit 28.

The output of bistable 57 is connected with the base of a NPN transistor 61.

Through a diode 62 the collector of transistor 61 is connected with a winding 63 of a relay having a contact 64 comprised in the machine cycle control box and open under rest conditions of rest.

In parallel with winding 63 there is a suppressor diode 65. The excitation of the relay and consequently the closure of contact 64 is controlled by transistor 61 and furthermore by another NPN transistor 67 having a diode 68 series-connected with the collector.

The state of transistor 67 depends on the voltage level on its base.

The latter is connected with the output of an operational amplifier 70 which in turn, through a resistance 71, receives the output signal of unit 26 at the positive input.

At the positive input amplifier 70 is connected in feedback by a resistance 72 and at the negative input receives an adjustable reference voltage supplied, through a resistance 75, by a potentiometer 74 fed by a suitable voltage source.

Bearing in mind that some of the NANDs of FIG. 2 have the two inputs connected with each other and work substantially as inverters, the operation of the apparatus now is described. Ring 11 is loaded on sliding shoes 13, 14, then spindle 15 is operated to attract the ring itself and to cause it to revolve. Feelers 18, 19 contact the outer surface of ring 11.

Contact 33 is opened by a suitable (not illustrated) automatism operated by the machine cycle control box. Therefore capacitor 32, which was formerly short-circuited, charges through resistance 31. When the voltage on capacitor 32 exceeds the threashold of NAND 34, at the output of the latter there is a low-level signal (signal O).

The output of NAND 35 comes to level 1 and therefore unit 25 is triggered.

The delay due to the loading time of capacitor 32 is preset so that unit 25 is triggered when feelers 18, 19 steadily contact ring 11, after the transient which takes place as a consequence of their initial impact with the ring itself has terminated. The machining operations preceding the grinding operation always produce pieces with some ovality. Therefore, if the ring rotates, this ovality is detected by unit 25.

If contrariwise the piece doesn't rotate as required, it follows that unit 25 detects a seeming lack of ovality, as feelers 18, 19, acting according to a direction substantially fixed with regard to the machine, always gauge the same diameter.

The presence of the lack of ovality are taken as a criterion to check whether the piece is really revolving.

If the piece is evenly revolving, unit 25 detects the ovality (i.e. difference between the maximum and the minimum diameter of the piece) and supplies an output signal sufficiently high so that the voltage at the positive input of amplifier 37 is higher than the voltage at the negative input.

Therefore amplifier 37 commutates supplying a signal 1 at the input of NAND 41. Then the output of NAND 41 and the input of NAND 42 ("SET" terminal of bistable multivibrator 44) reach level 0.

On the contrary, the RESET input of bistable 44 reaches level 1 as capacitor 32 is charged.

The output of the bistable 44 connected with the base of transistor 45 comes to level 1 and transistor 45 begins conducting.

Winding 48 becomes energized and closes contact 49 which supplies to the machine cycle control box a consent signal for the feeding of grinding wheel 12.

If on the contrary unit 25 doesn't detect any ovality (apart from the disturbances the influence of which is avoided by suitably regulating the reference voltage supplied by potentiometer 38) the "SET" input of bistable 44 remains at level 1.

The output of bistabel 44 remains at level 0, transistor 45 is cut off and contact 49 is opened.

The operation of unit 25 is programmed so that the ovality is measured for some time (possibly including the first phases of the stock removal).

The indication at the output of bistable 44 is stored till the machining of every ring 11 ends.

At the end of the machining switch 33 is closed by the relevant automatism operated by the machine cycle contorl box RESET terminal of bistable 44 reaches 0, and the SET terminal reaches 1. The output of bistable 44 reaches, 0 and contact 49 opens again.

Therefore the rotation of ring 11 before the stock removal (and possibly for the first stock removal phases) is checked on the basis of the measure of the ovality.

If the circuit gave the consent for the grinding wheel feeding, the rotation is checked then on the basis of the measure of the stock removal rate.

As a matter of fact, after the consent the cathode of diode 51 reaches the voltage level 1 and capacitor 53 charges. When the voltage on capacitor 53 exceeds the threshold of NAND 55 the output of the latter reaches level 0. The output of NAND 56 comes to level 1.

The delay due to capacitor 53 is preset to take into account the time necessary for grinding wheel 12 to move into touch with ring 11.

Signal 1 at the output of NAND 56 triggers timing circuit 28 of unit 26 which reckons the stock removal rate. If ring 11 rotates evenly a stock removal rate different from zero is detected the voltage at the positive input of operational amplifier 70 exceeds the voltage at the negative terminal and amplifier 70 switches over giving a signal 1 to the base of transistor 67. Transistor 67 begins conducting and its emitter current energizes winding 63 which keeps contact 64 closed. This gives to the machine cycle control box the consent for the going on of the machining cycle.

If on the contrary ring 11 doesn't rotate, unit 26 detects a stock removal rate equal to zero (apart from the disturbances the influence of which is avoided by advisably adjusting the reference voltage supplied by potentiometer 74) and transistor 67 is switched off.

During the time passing before unit 26 finishes reckoning the stock removal rate, (this happens some time, although it is short, after unit 26 is triggered) contact 64 is closed through the collector current of tranistor 61 (so that the grinding wheel moves forward, provided that contact 49 gave its consent to the machine cycle control box). The state of transistor 61 is controlled by bistable 57. At the beginning, when the voltage on capacitor 53 is at level zero and unit 26 has been not yet triggered to reckon the stock removal rate, the SET of bistable 57 receives a signal 1 from timing circuit 28.

Therefore the output of bistaple 57 is at level 1, transistor 61 conducts and contact 64 is closed.

When the voltage on capacitor 53 reaches level 1 the SET, the RESET and the output of bistable 57 are all at level 1. After sufficient time clapsed for unit 26 to reckon the value of the stock removal rate, timing circuit 28 brings the SET of bistable 57 to the level 0.

When the output of bistable 57 reaches the level 0, transistor 61 stops conducting and the position of contact 64 depends on the signal at the base of transistor 67.

As stated formerly, the checking of the rotation of the piece can be carried out by the only circuit for reckoning the ovality also in the stock removal phases, except for the last ones (finishing and sparkout phases) since ovality tends to disappear during them. In some cases it may be advisable to check the rotation only during the stock removal phase by means of the circuits associated to unit 26.

According to another variant of the present invention, unit 25 can be replaced by a band-pass filter circuit. The other components of the apparatus of FIG. 2 associated to unit 25 are substantially unchanged. The working of the so modified apparatus is based on the following considerations. When ring 11 rotates under feelers 18, 19, both at the beginning and during the machining cycle, the rubbing of the feelers against the rough or machined surface of the piece causes high-frequency mechanical vibrations.

These mechanical vibrations of feelers 18, 19 are detected by group 29 as electrical oscillations. In view of the measure of the diameter of ring 11 said oscillations (having a high frequency as compared with the frequency of the signal indicative of the measure) represent some disturbances and are removed by low-pass filters.

According to the present invention, the presence or the absence of these high-frequency vibrations is taken as a criterion to assess whether ring 11 is revolving.

For this purpose the electric signal detected by group 29 is sent directly to a band-pass filter circuit (replacing unit 25) adapted to electronically detect said high-frequency oscillations and to give at the output a signal proportional to their amplitude. As the frequency of such oscillations depends on the rotation speed of the piece, by suitably requlating the cut-off frequencies of the filter it is possible to achieve a stop or alarm signal even if the piece rotates at a speed too different from the desired value. An analogous result can be achieved by replacing units 25, 26, or associating them, with a frequency-meter detecting the frequency of the oscillations being in the output signal of group 29 owing to the ovality of the piece and/or the stock removal and controlling a stop or alarm circuit.

It is evident that other variants and changes, besides the ones already mentioned, can be made to the described method and apparatus without departing from the scope of the invention.

I claim:

1. A method for checking the operation of a grinding machine for the machining of rotating mechanical workpieces, substantially of circular cross-section, comprising the steps of:

obtaining a measuring signal responsive to the workpiece size, this step being carried out both before and during the stock removing phases of the machining operation;

processing the measuring signals occurring at subsequent time intervals, said processing step including generating at least one variable signal responsive to the measurement of size variations of the workpiece both before and during the stock removing phases of the machining operation;

comparing the variable signal generated with a reference signal;

utilizing the result of the comparison for providing a signal indicative of the evenness of the rotation of the workpiece; and utilizing the latter signal as a conset for the prosecution of the machining depending on whether the workpiece rotates evenly.

2. An apparatus for checking the operation of grinding machine for the machining of rotating mechanical workpieces, substantially of circular cross-section, comprising:

measuring means adapted to be located in a measuring position on the pieces to supply measuring signals responsive to their sizes;

processing means adapted to process the measuring signals detected in subsequent time intervals and comprising an output for supplying information on the geometrical features of the pieces and/or their variations;

delay and timing means connected with said processing means and operated by the machine cycle to trigger the processing means;

comparison means connected with the output of said processing means and adapted to compare the signals at the output itself with preset reference signals, for providing, both before and during the stock removing phases of the machining, a signal indicative of the evenness of the rotation of the workpieces; and consent means connected with said comparison means for providing, both before and during the stock removing phases of the machining, a consent signal for the prosecution of the machining depending on whether the workpieces rotate evenly.

3. The apparatus according to claim 2, in which said processing means checks the shape errors of the piece by processing the measuring signals detected along its surface as a result of its rotatory motion, said delay and timing means triggering said unit with a delay sufficient to ensure the end of possible transients following the location of the measuring means in the measuring position on the piece, said comparison means being adapted to give to the consent means signals of the ON-OFF type as a consequence of the level of the output signals of said unit.

4. The apparatus according to claim 2, in which said processing means reckons the rate of stock removal from the piece being machined, said delay and timing means being adapted to trigger said unit after the real contact of the grinding wheel with the piece, the comparison means providing an output signal of the ON-OFF type dependent on the level of the output signals of said unit.

5. The apparatus according to claim 3, in which said processing means reckons the rate of stock removal from the piece being machined, said delay and timing means being adapted to trigger said unit after the contact of the grinding wheel with the piece, the comparison means having an output signal of the ON-OFF type dependent on the level of the output signals of said unit.

6. The apparatus according to claim 2, in which said processing means includes band-pass filter circuits adapted to filter said measuring signals to detect oscillations dependent on the presence of the relative motion between the piece and the measuring means due to the piece rotation.

7. The apparatus according to claim 5, wherein the input of said delay and timing means adapted to trigger the unit to reckon the stock removal rate is connected with circuits associated to a consent element adapted to allow the machining cycle to go on dependent on the output signal of said unit for reckoning the shape errors.

8. The method according to claim 1, in which said processing step includes processing said measuring signal to obtain said variable signal as responsive to the ovality of the workpiece at a certain time.

9. The method according to claim 1, in which said processing step includes processing said measuring signal to obtain said variable signal as responsive to the rate of stock removal from the workpiece.

10. The method according to claim 1, in which said processing step includes processing said measuring signal to obtain said variable signal as responsive to the amplitude of oscillations of the measuring signal due to mechanical vibrations caused by the rotation of the workpiece.

* * * * *